United States Patent [19]

Sato

[11] Patent Number: 5,579,123
[45] Date of Patent: Nov. 26, 1996

[54] TRACK JUDGEMENT APPARATUS FOR DISCRIMINATING BETWEEN VIDEO AND OTHER SIGNALS DURING SIGNAL REPRODUCTION

[75] Inventor: Kouichi Sato, Tokyo, Japan

[73] Assignee: Asahi Kogaku Kogyu Kabushiki Kaisha, Tokyo, Japan

[21] Appl. No.: 213,466

[22] Filed: Mar. 15, 1994

Related U.S. Application Data

[63] Continuation of Ser. No. 938,588, Sep. 2, 1992, abandoned, which is a continuation of Ser. No. 683,629, Apr. 11, 1991, abandoned.

[30] Foreign Application Priority Data

Apr. 13, 1990 [JP] Japan ................................ 2-98538
Apr. 13, 1990 [JP] Japan ................................ 2-98539

[51] Int. Cl.$^6$ ............................................ H04N 5/76
[52] U.S. Cl. ............................................ 386/96; 386/46
[58] Field of Search ................................ 358/341, 343, 358/330, 310, 335; 360/19.1, 33.1, 18, 20; H04N 5/76, 9/79

[56] References Cited

U.S. PATENT DOCUMENTS

| 4,398,219 | 8/1983 | Yasuda | 358/315 |
|---|---|---|---|
| 4,446,488 | 5/1984 | Suzuki | 358/343 |
| 4,542,419 | 9/1985 | Morio et al. | 358/343 |
| 4,602,295 | 7/1986 | Moriyama et al. | 358/343 |
| 4,672,473 | 6/1987 | Sugiyama | 358/341 |
| 4,757,393 | 7/1988 | Dakin et al. | 358/343 |
| 4,811,120 | 3/1989 | Kashida et al. | 358/343 |
| 4,823,197 | 4/1989 | Sakata et al. | 358/343 |
| 4,922,344 | 5/1990 | Reigal | 358/148 |
| 4,958,246 | 9/1990 | Kozuki et al. | 360/19.1 |

FOREIGN PATENT DOCUMENTS

| 0180477A2 | 5/1986 | European Pat. Off. . |
|---|---|---|
| 0291028A2 | 11/1988 | European Pat. Off. . |
| 2540321 | 8/1984 | France . |
| 3144191 | 6/1982 | Germany . |
| 3533473 | 6/1986 | Germany . |
| 3510766 | 9/1986 | Germany . |
| 3624856 | 1/1988 | Germany . |
| 3809076 | 9/1989 | Germany . |
| 1302577 | 12/1989 | Japan . |

*Primary Examiner*—Thai Q. Tran
*Assistant Examiner*—Khoi Truong
*Attorney, Agent, or Firm*—Sughrue, Mion, Zinn, Macpeak & Seas

[57] ABSTRACT

In a system for reproducing signals which may be video or audio, the reproduced signal is judged to be an audio signal if signals corresponding to sync signals occur at a rate frequency greater than once per field interval. In one embodiment, the track judgment system counts the output signals generated from a signal separating circuit during reproduction. The track judgment system also monitors the output of a pulse generator (PG) detector during reproduction. The outputs from the signal separating circuit and the PG detector are logically evaluated to determine the type of signal being reproduced.

18 Claims, 11 Drawing Sheets

H : THE HORIZONTAL SCANNING LINE

FIG. 6

| SECTOR TYPE | POLARITY OF START FLAG | POLARITY OF END FLAG |
|---|---|---|
| TYPE 1 | HIGH LEVEL | LOW LEVEL |
| TYPE 2 | HIGH LEVEL | LOW LEVEL |
| TYPE 3 | HIGH LEVEL | HIGH LEVEL |
| TYPE 4 | LOW LEVEL | HIGH LEVEL |

FIG. 7

| SECTOR TYPE | USE |
|---|---|
| TYPE 1 | LEADS TO THE NEXT SECTOR ON THE TRACK. |
| TYPE 2 | TERMINATES A TRACK AND LEADS TO SECTOR #0 ON THE SUB-SEQUENT TRACK. |
| TYPE 3 | TERMINATES THE SEQUENCE. |
| TYPE 4 | UNUSED. ALL SECTORS REMAINING AFTER THE TRACK HAS BEEN TERMINATED ARE TYPE 4. |

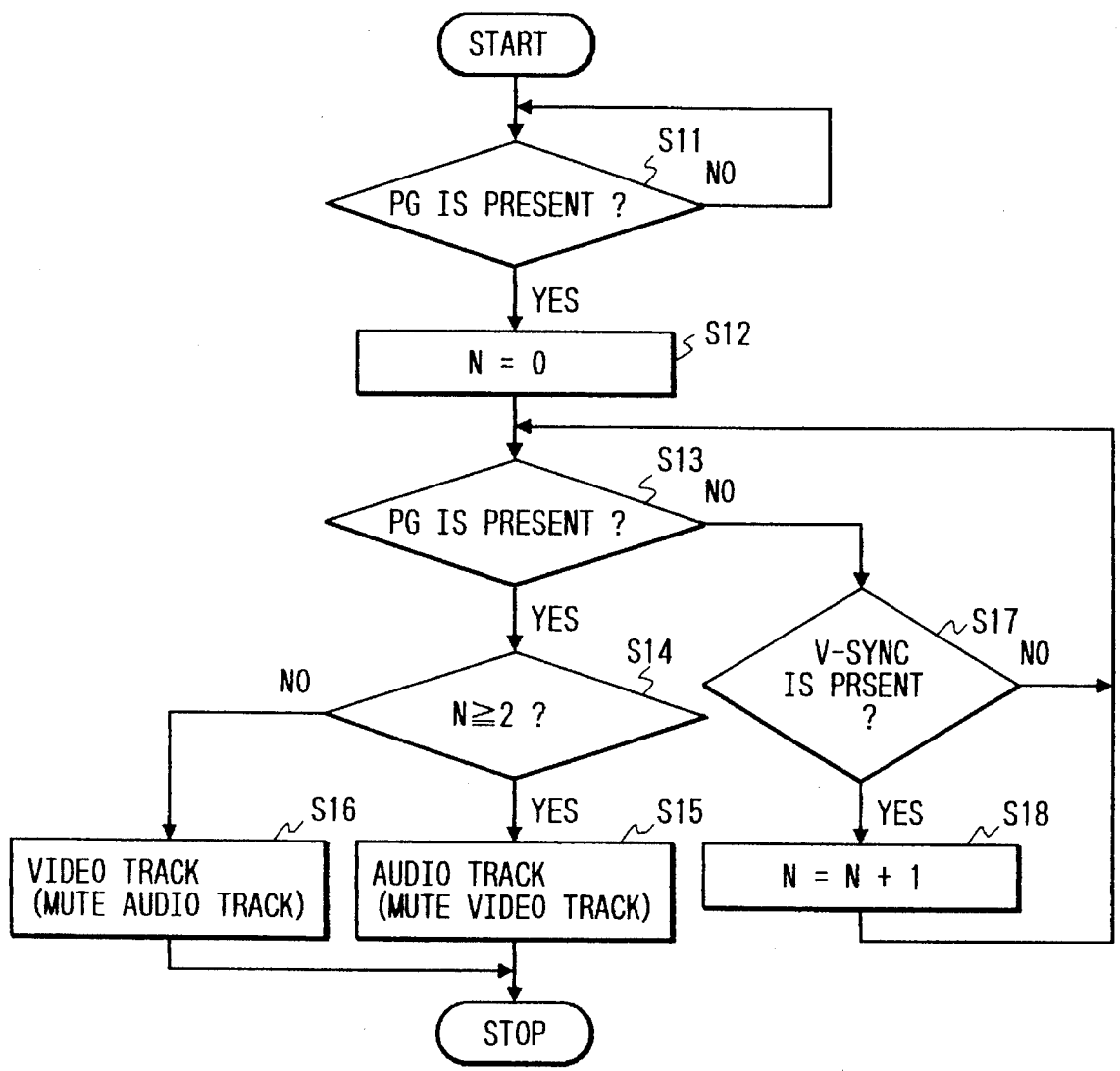

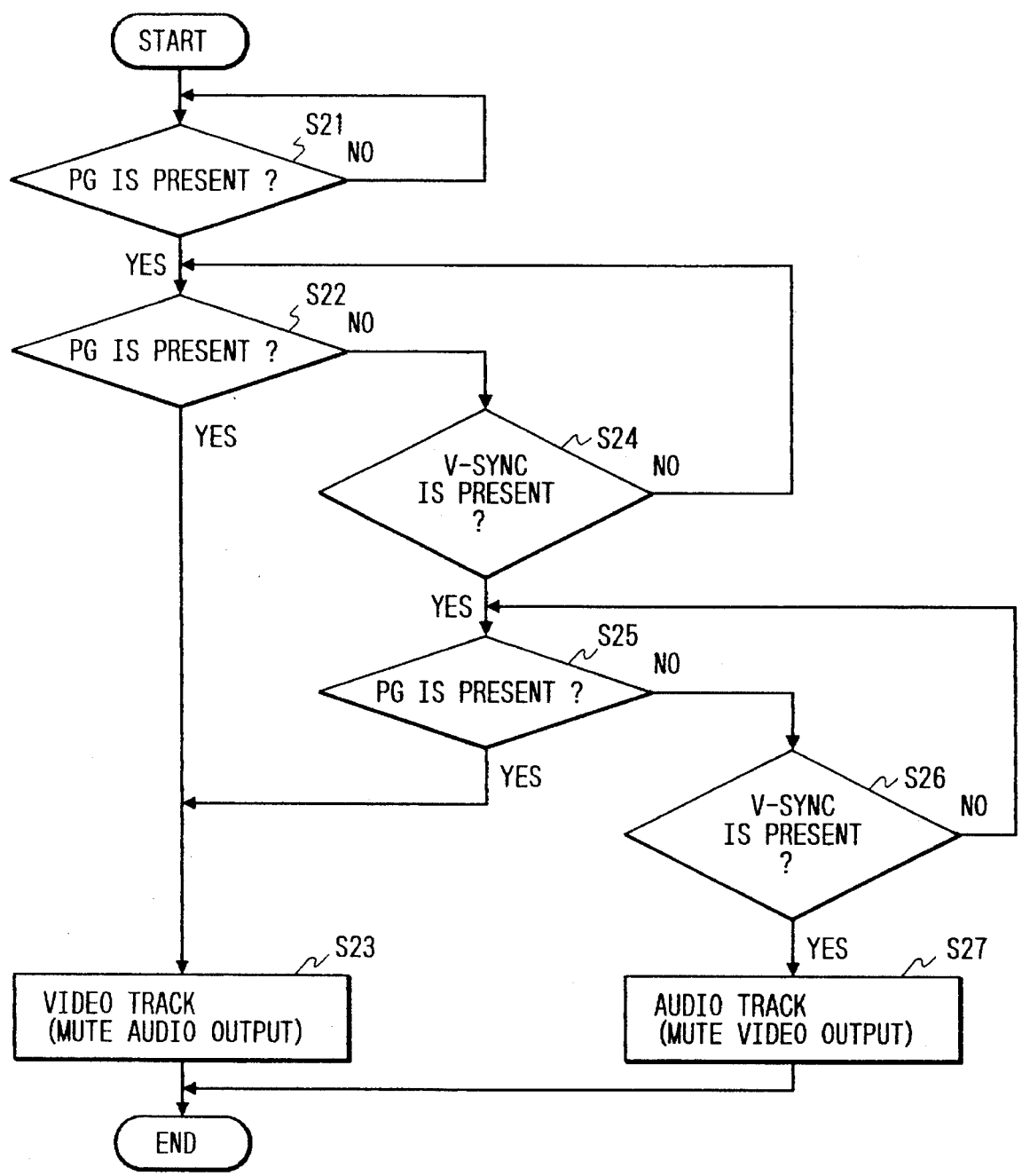

TRACK JUDGEMENT APPARATUS FOR DISCRIMINATING BETWEEN VIDEO AND OTHER SIGNALS DURING SIGNAL REPRODUCTION

This is a continuation of application Ser. No. 07/683,629 filed Apr. 11, 1991 now abandoned.

BACKGROUND OF THE INVENTION

This application is based on and claims priority from Japanese Application No. Hei. 2-98538 and Japanese Application No. Hei. 2-98539, both filed Apr. 13, 1990, the disclosures of both being incorporated by reference herein.

The invention relates to track judgment in an apparatus suitable for use in reproducing, e.g., magnetic recording disks.

Electronic still video cameras can record not only video signals, but if necessary can also record audio signals on video floppy disks. FIG. 1 is a block diagram showing the construction of one example of pertinent portions of conventional playback circuitry for such magnetic recording disks. A signal reproduced from a head 1 is amplified by a reproducing (playback) amplifier 2 and then applied to a high-pass filter and equalizer 3, a low-pass filter 4, and a band-pass filter 5.

The high-pass filter and equalizer 3 separates a high-frequency component from an input signal and equalizes and outputs the separated high-frequency component to a luminance signal demodulating circuit 6. The luminance signal demodulating circuit 6 demodulates the frequency modulated luminance input signal and outputs the demodulated signal to a luminance signal processing circuit 10 and to an audio signal processing circuit 9. The luminance signal processing circuit 10 processes the demodulated luminance signal Y and outputs the processed luminance signal to an adder 13. The audio signal processing circuit 9 processes the demodulated audio signal and outputs the processed signal as an AUDIO OUT signal through a switch 14.

In addition, the audio signal incorporates a flag indicating start or end, and various control codes. When such flag and control codes are detected at the audio signal processing circuit 9, the detection result is applied to a CPU 12.

The low-pass filter 4 separates a low-frequency component (an FM color signal component) from an input signal and outputs the separated component to a color signal demodulating circuit 7. The color signal demodulating circuit 7 demodulates the FM color signal and outputs the demodulated signal to a color signal processing circuit 11. The color signal processing circuit 11 processes the demodulated color signal and outputs the processed signal C to an adder 13.

The band-pass filter 5 separates a predetermined frequency band signal (an ID signal) and outputs the separated signal to an ID demodulating circuit 8. The ID demodulating circuit 8 demodulates the ID signal and outputs the demodulated signal to the CPU 12. The CPU 12 generates a character signal or the like corresponding to the ID signal whenever necessary, and applies the generated output to the adder 13. The ID signal includes informations as to the track number, a recording date for the video signal and the like.

The adder 13 adds up video signals from the luminance signal processing circuit 10, the color signal processing circuit 11, and the CPU 12, and applies the sum as a VIDEO OUT signal through the switch 14.

In the meantime, the CPU 12 judges whether the track being reproduced is a track on which a video signal is recorded or a track on which an audio signal is recorded, in accordance with a flow chart shown in FIG. 7 and then controls the switch 14. Specifically, during reproduction of a magnetic recording disk (not shown) by the head 1 (Step S1), the CPU 12 judges whether or not an ID is present or not in the output of the ID signal demodulating circuit 8 (Step S2). Since the ID (DPSK) signal is recorded on a track on which a video signal is recorded (hereafter a "video track"), the detection of the ID means that the reproduced track is a video track. Thus, when the reproduced track is a video track, the CPU 12 opens an upper contact of the switch 14 shown in FIG. 6 to mute the voice output (Step S4).

On the other hand, when the reproduced track is an audio track, a flag or control code is recorded on the audio track. Thus, when no ID signal is detected at Step S2 and the flag or control code has been detected at Step S3, the reproduced track is an audio track. As a result, the CPU 12 opens a lower contact (opposite to the contact in Step S4) of the switch 14 shown in FIG. 6 to mute the video signal (Step S5).

In this manner, the type of reproduced signal is selected and outputted correctly and automatically, irrespective of whether the reproduced track is video or audio.

The conventional apparatus judges the type of track, either video or audio, from the presence of the flag or control code incorporated in the audio track or the presence of the ID signal incorporated in the video track. As a result, judgment of the type of reproduced track may be subject to errors when errors occur during a data reading operation. In addition, the conventional apparatus must be provided with the audio signal processing circuit and the ID signal demodulating circuit. An output which is produced from either the audio signal processing circuit or the ID signal demodulating circuit has to be used to judge the type of the track, and thus the conventional apparatus is disadvantageous in that a relatively long period of processing time may be required.

SUMMARY OF THE INVENTION

The invention has been made in view of the above circumstances, and it is an object of the invention to provide a track judgment apparatus capable of detecting the type of reproduced track correctly without being affected by data reading operation, and with no audio signal processing circuit or ID signal demodulating circuit for track judgement.

This is accomplished according to the present invention by an apparatus for discriminating between video and further signals during reproduction of a signal from a medium storing both video and further information, wherein reproduced video signals include a predetermined signal portion occurring at a video signal rate, the apparatus comprising: first means for generating a detection signal upon the occurrence in the reproduced signal of a signal portion at least similar to the predetermined signal portion; and second means for determining the reproduced signal to be a further signal if the first means generates the detection signals at a rate other than the video signal rate.

This is also accomplished according to the present invention by a track judgment apparatus comprising: first means for reproducing signals from a disk, the reproduced signals comprising video and audio signals and the video signals including vertical synchronizing signals; second means for generating a detection signal upon the occurrence in the reproduced signal of a signal portion at least similar to the vertical synchronizing signal; and third means for determining the reproduced signal to be an audio signal if the first means generates said detection signals at a rate greater than a rate at which said vertical synchronizing signals occur in the reproduced video signals.

This is further accomplished according to the present invention by a track judgment apparatus comprising: means for reproducing a video signal including a synchronizing signal, which is recorded on a video track or an audio signal including a control signal, which is recorded on an audio track; means for separating the synchronizing signal or control signal from an output of said reproducing means to output a detection signal; means for detecting one rotation of said disk; and means for counting a number of outputs of the separating means and judging whether the count coincides with the signal corresponding to the number of the vertical synchronizing signals which are reproduced during the one rotation of said disk.

A track judgment apparatus of the invention further comprises: means for reproducing a video signal including a synchronizing signal, which is recorded on a video track or an audio signal including a control signal, which is recorded on an audio track; means for separating the synchronizing signal or control signal from an output of the reproducing means to output a detection signal; means for determining whether the following output of said separating means occurs or not, after the detection of the output thereof, within a predetermined period not longer than an interval of said vertical synchronizing signal.

The track judgment apparatus thus constructed judges the type of track from the interval of the vertical synchronizing signal, thereby not being affected by data reading operation.

BRIEF DESCRIPTION OF THE DRAWING

The invention will be more clearly understood from the following description in conjunction with the accompanying drawings, wherein:

FIG. 6 is a schematic diagram showing specifications for each type of sector;

FIG. 7 is a table showing use of the four types of sectors;

FIGS. 11 and 13 are flow charts for a description of operation of the embodiment shown in FIG. 10;

DETAILED DESCRIPTION OF THE INVENTION

Before describing an operation of the present invention, a magnetic recording disk per se and both video and audio tracks formed on the magnetic recording disk will be first described.

Figure 3:
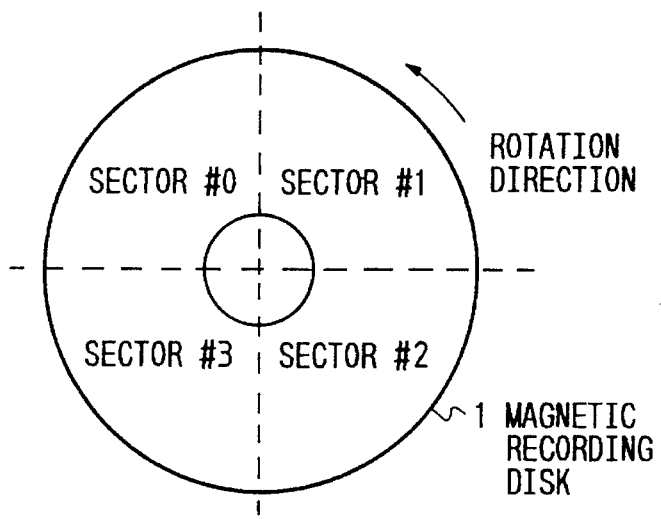
FIG. 3 is a diagram for a description of sectors of a magnetic recording disk.

Generally, recording tracks, 50 recording tracks for instance are provided to the magnetic recording disk as shown in FIG. 3. In this case, an outer-most track is designated by a first track whereas an inner-most track is designated by a 50th track. Some tracks on which FM video signals are recorded are video tracks, and the others on which FM audio signals are recorded are audio tracks.

The audio tracks are divided into four sectors as shown in FIG. 3, and independent informations are separately recorded in the four sectors. In this case, it should be noted that the video tracks are not divided in the same manner as that of the audio tracks. The FM video signal and a DPSK (Differential Phase Shift Keying) modulated ID code are recorded on each of the video tracks in frequency-multiple manner. On the other hand, recorded on the audio track is an audio signal which is compressed in a time-axis, together with control code and flags. The audio signal is multiplied in the time-axis with the control code and then subjected to an FM modulation to be recorded thereon.

The video signal for one field is recorded on a single track. According to an NTSC system, a single picture is formed by two fields (one frame), and thus a picture image is displayed by signals recorded on the two tracks in a usual mode. However, in order to increase the recording capacity, there is another recording mode to display a single picture with a signal recorded on a signal track. The recording modes can be selected by an operator.

Figure 4:
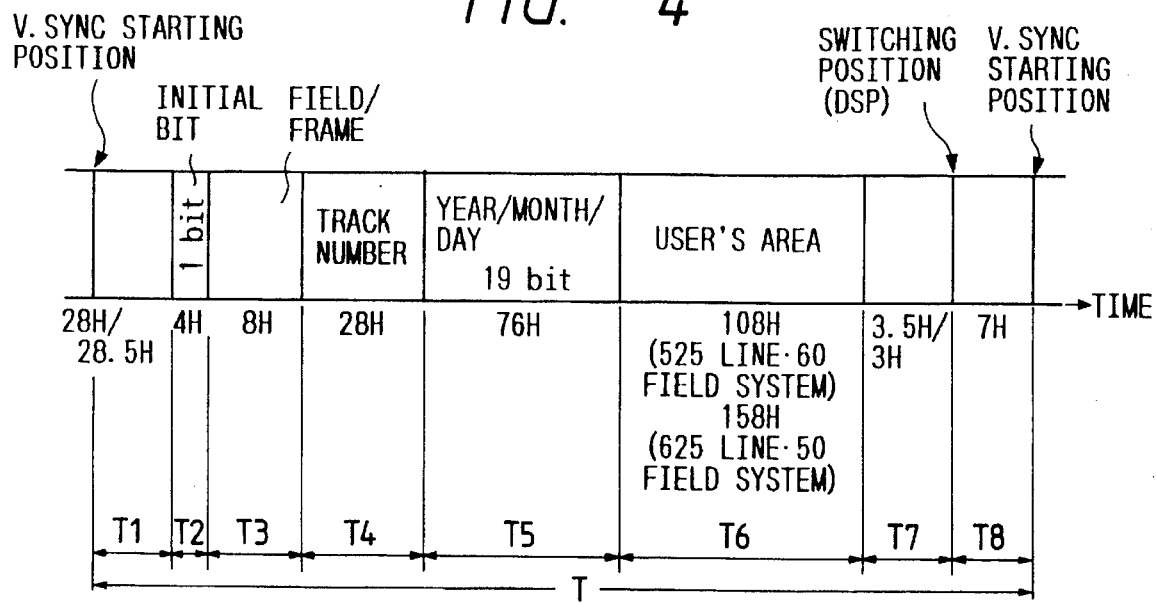
FIG. 4 is a schematic diagram showing bit allocation for an ID signal.

FIG. 4 is a schematic diagram showing a bit allocation of ID codes which is recorded together with a video signal on a video track, in which T denotes a vertical synchronization signal interval equal to a period of time for one revolution of the disk, and the picture can be replaced by switching position. T1, T7 and T8 designate periods for margin, respectively, and T2 is an initial bit period representing a start time.

A field/frame code which indicates whether a track played back consists of a field picture or a frame picture is recorded during a period of T3. This code shall be recorded whenever a frame picture is recorded. In the frame mode, a video signal for a single picture (two fields) is recorded on two tracks, and thus an information as to the track position where the following field signal is recorded, that is, an outer side track or an inner side track, is recorded together.

A track number where a video signal is recorded is recorded during a period T4 and a data which is voluntarily used by an operator is recorded during a period T6. In this case, the following track number, a reproducing period T which is set by the operator, and a recording mode ( an AV mode or a normal mode including A mode or V mode) are recorded in the user's area T6.

Figure 5:
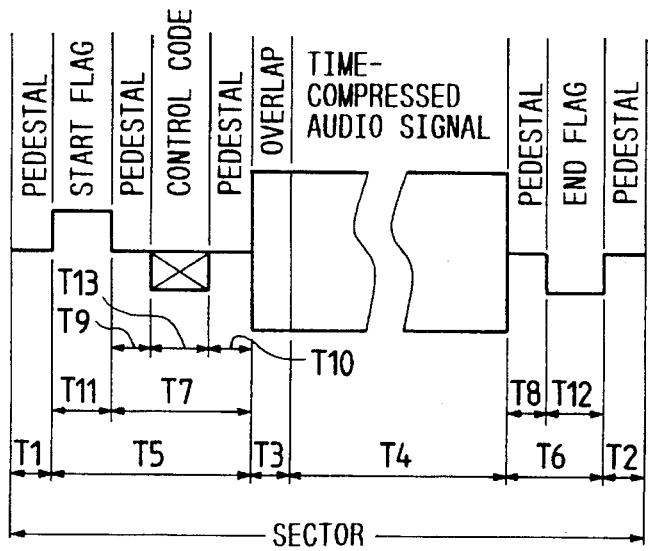
FIG. 5 is a schematic diagram showing a sector format for an audio signal.

The signal arrangement of an audio signal for each sector, that is the sector format is shown in FIG. 5. There occurs pedestal levels during periods of time T1, T9, T10, T8 and T2, which represent a reference level. During reproduction, the pedestal level is clamped to a predetermined reference level which is used as a threshold level to judge the level of data during the other periods of time. The start flag during the period of time T11 and the end flag during the period of time T12 are used not only to detect either the start or the end but also to detect the type of sector 1 to 4 as described in detail latter. The control code during the period of time T13 is used to record a variety of control data. The data which is recorded during an overlap portion T3 is used to maintain the sequence of an audio data stored during T4, the audio data being stored in a plurality of sectors. Each sector have the overlap portion which contains the same signal as the last part of the preceding sector in the sequence.

The specifications for each type of sector are shown in FIG. 6. The types of sectors are distinguished by the combination of polarities of the start and end flags. In this case, the combinations thereof for the types 1 and 2 are identical to each other, but the method for distinguishing those will be described hereinafter. FIG. 7 is a table defining the four types of sectors in term of their use.

Figure 8:
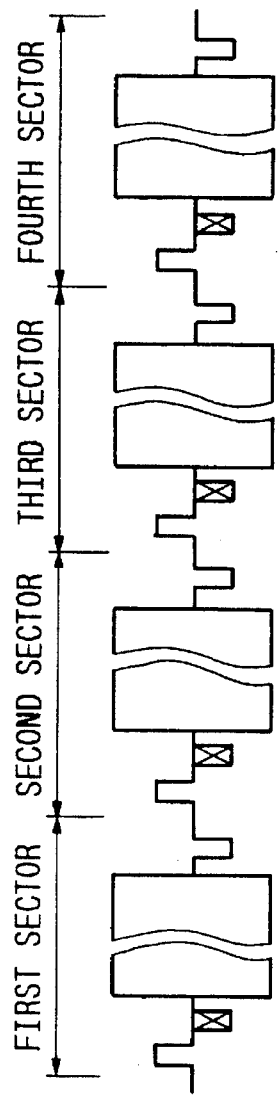
FIG. 8 is a schematic diagram showing a track format of an audio signal.

FIG. 8 is a schematic diagram showing a signal arrangement, particularly a track format, in which each track is provided with four sectors in sequence. The first to third sectors belong to the type sector which leads to the following sector on the track. The remaining fourth sector is of the type 3 which terminates the sequence.

Figure 9:
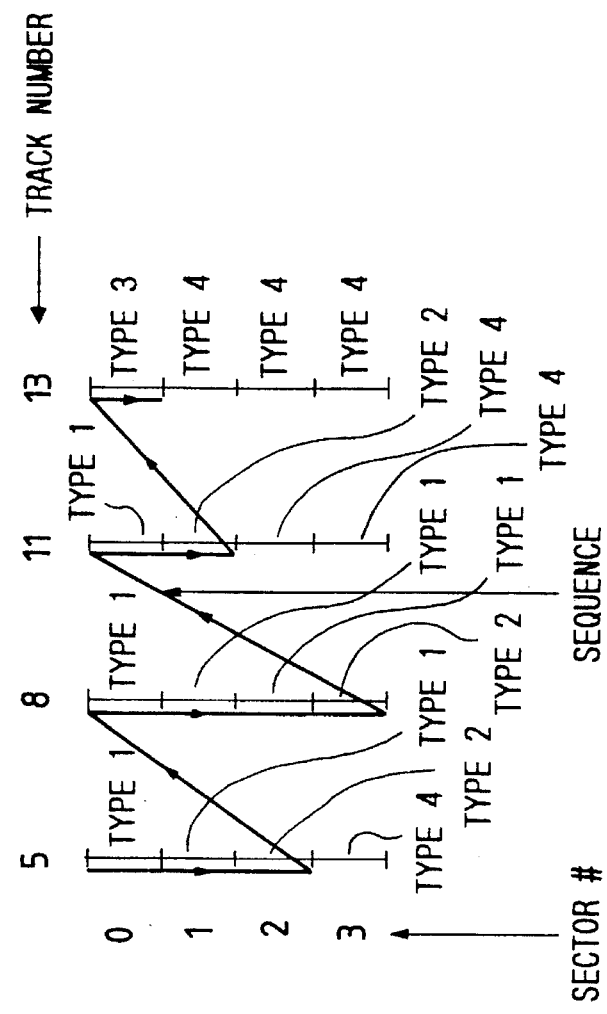
FIG. 9 is a diagram showing an example of how a sequence is recorded showing the four types sectors.

FIG. 9 is a schematic diagram showing the use of these sectors. In FIG. 9, the sequence is recorded on four sectors 0 to 3 and the audio signals are recorded on the tracks 5, 8, 11 and 13 in sequence. As shown in FIG. 9, there are two sectors of type 1 in series on the track 5 and there is a sector following the type 1 sectors thereon. The sector of type 2 which follows the type 2 sector on the track 5, is the first sector of the type 1 occurring on the track 8. Data as to the position of the following sector on the track 8 is recorded as a control code in the signal arrangement as shown in FIG. 5. Since no audio signal is recorded on the fourth sector on the track 5, a sector of the type 4 is assigned thereto. There are three sectors of the type 1 in series and a sector of the type 2 following the series of the three sectors on the track 8. The position of the following track is recorded as a control code. In this case, the following track number is 11.

There are sector of the type 1 and a sector of the type 2 in series on the track 11. As is similar to the track 8, the position of the following sector is the first sector on the track 13 in the sector of type 2 on the track 11 as the control code. The remaining two sectors on the track 11 are of the type 4. There is provided a sector of the type 3 on the track 13, which terminates the sequence. Since the sequence is terminated by the first sector on the track 13, the remaining three sectors are of the type 4 as shown in FIG. 7. With an example of FIG. 9, the sequence commences from the first sector on the track 5 and terminates at the first sector on the track 13.

As shown in FIG. 9, when the sequence is shifted to another track before the fourth sector on the track 5 for instance, the type of the third sector on the track 5 is of the type 2 having the start flag of high level and the end flag of low level which is of the same as those of the type 1. In this case, however, the following fourth sector is of the type 4 which indicates the sector being unused, and therefore it is possible to distinguish the sector of the type 2 from the sector of the type 1. On the other hand, in the case where the sequence is recorded on all of four sectors of the track 8 for instance, and then the sequence is shifted to the following track, the track of the type 2 is distinguished from the sector of the type 1 because the fourth sector is the end sector of each track.

Figure 10:
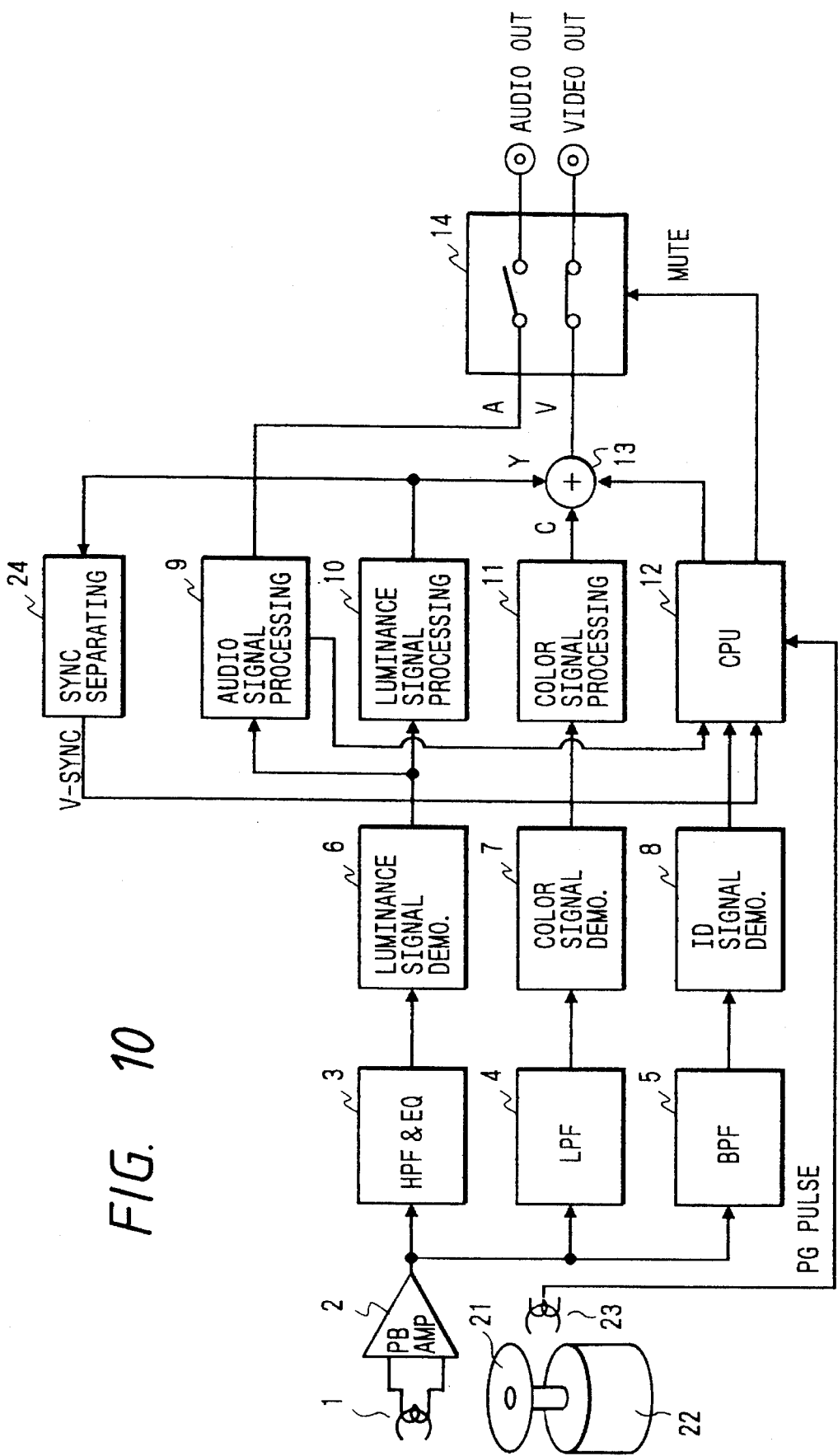
FIG. 10 is a block diagram showing a reproducing system to which an example of a track judgment apparatus according to the invention is provided.

FIG. 10 is a block diagram showing track judgment circuitry according to a first embodiment of the invention. In FIG. 10, the same reference numerals designate like parts shown in FIG. 1, and their description will be omitted to avoid repetition.

In FIG. 10, a disk 21 is rotated by a motor 22. The rotation of the disk 21 is detected by a pulse generator (PG) detector 23 which is a coil for generating a pulse signal with an iron member provided to a predetermined position on a hub (not shown) of the disk 21, and the detection result is applied to a CPU 12. Further, part of an output from the luminance signal processing circuit 10 is supplied to a synchronizing signal separating circuit 24, so that a vertical synchronizing signal is separated. An output from the synchronizing signal separating circuit 24 is applied to the CPU 12.

Figure 1:
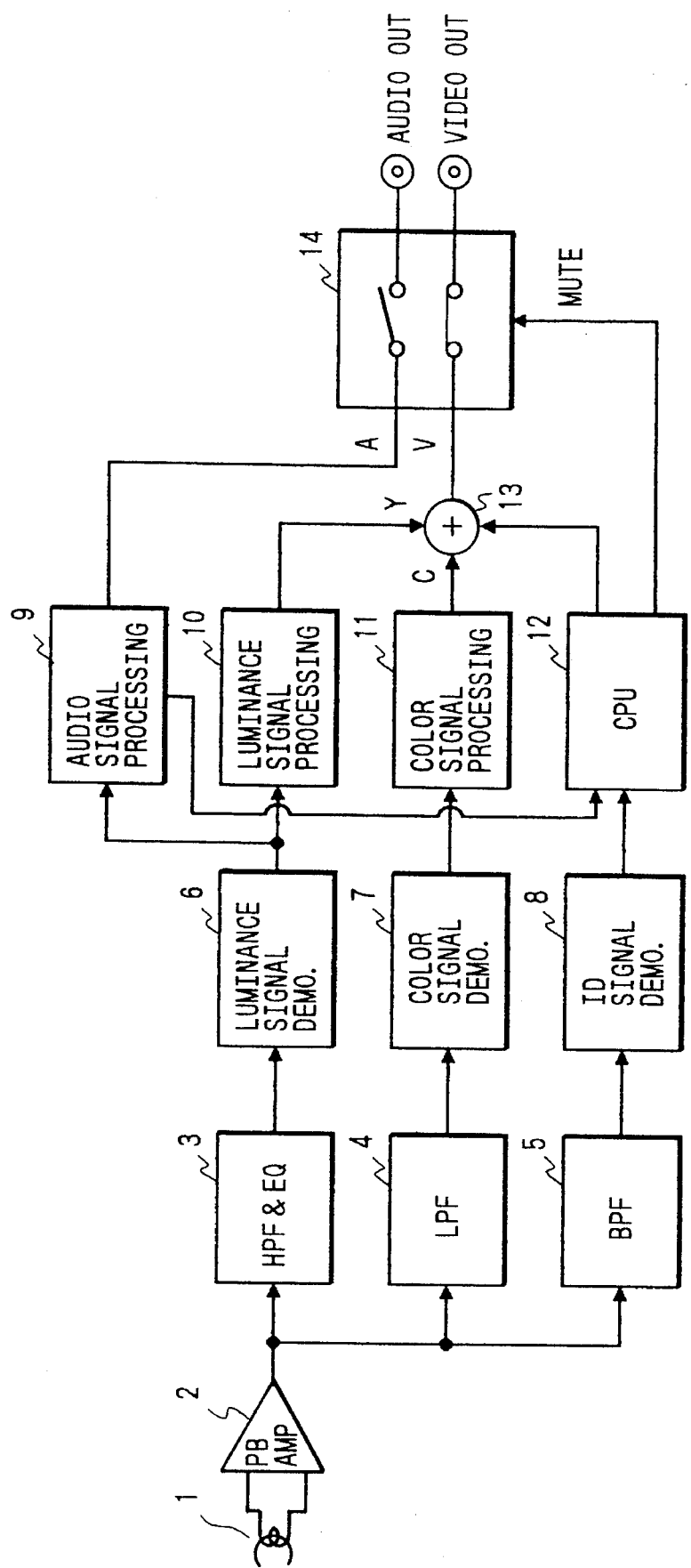
FIG. 1 is a block diagram showing pertinent portions of conventional track judgement circuitry.
Figure 2:
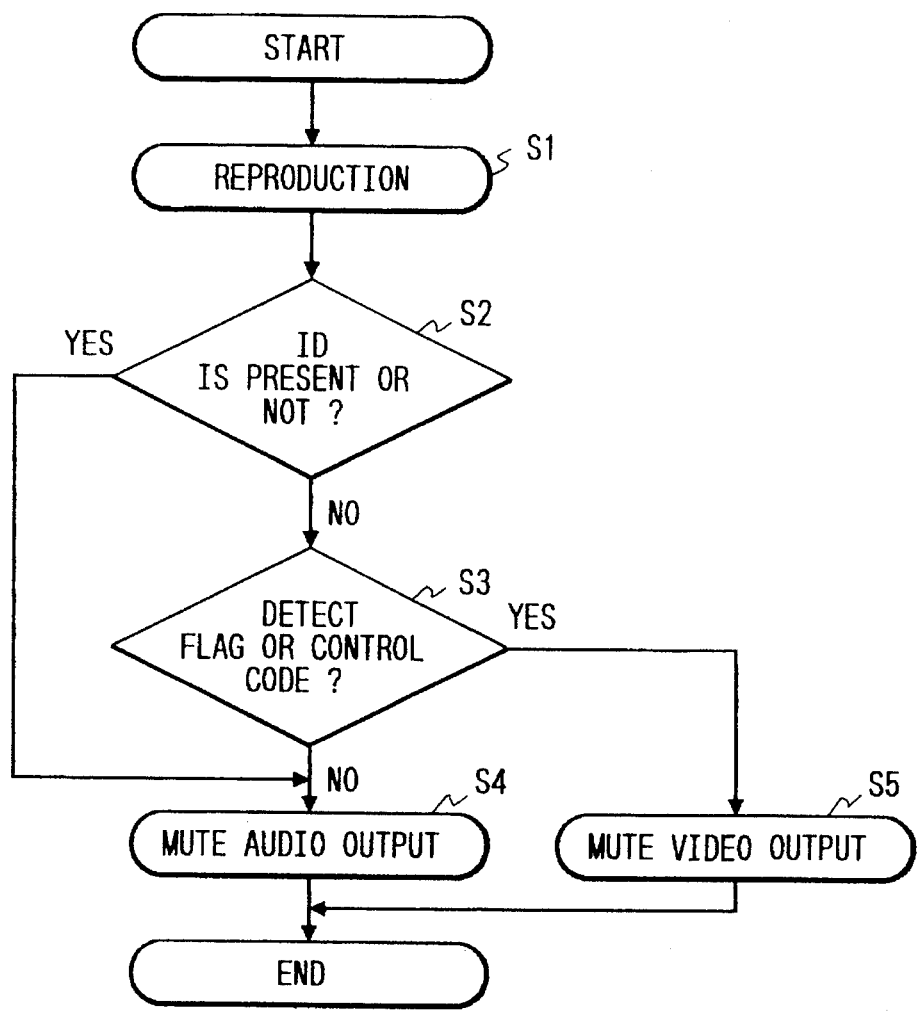
FIG. 2 is a flow chart for a description of an operation of the circuitry shown in FIG. 1.

Other aspects of the construction of the embodiment of FIG. 10 are the same as those of the conventional arrangement shown in FIG. 1. In FIG. 10 the ID demodulating circuit 8 and the audio signal processing circuit 9 are provided to reproduce the corresponding signals respectively, and thus they do not serve as a part of track judgement apparatus.

The operation of the embodiment of FIG. 10 will now be described with reference to a flow chart shown in FIG. 11.

The disk 21 is rotated by the motor 22, and the head 1 reproduces the disk 21. If the reproduced track is an audio track, an audio signal is outputted from the audio signal processing circuit 9, while if the reproduced track is a video track, video signals processed by the luminance signal processing circuit 10 and the color signal processing circuit 11 are outputted from the adder 13.

The CPU 12 monitors an output from the PG detector 23 and detects rotation of the disk 21 (Step S11). Upon detection of a PG pulse, the CPU 12 sets a variable N to 0 (Step S12). Then, when the synchronizing signal separating circuit 24 has produced a vertical synchronizing signal detection signal before a next PG pulse arrives (before the disk 21 completes one full rotation), the variable N is incremented by 1 (Steps S13, S17, S18).

Figure 12A:
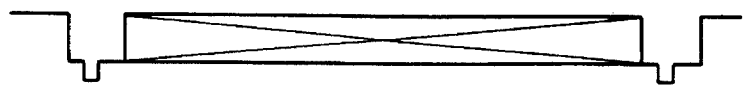
FIGS. 12A to 12L are charts showing output waveforms of a luminance signal processing circuit and a synchronizing signal separating circuit in the embodiment shown in FIG. 10.
Figure 12B:

If the reproduced track is a video track, the luminance signal processing circuit 10 outputs a luminance signal as shown in FIG. 12A. Therefore, the synchronizing signal separating circuit 24 outputs one synchronizing signal separation output such as shown in FIG. 12B for each full rotation of the disk 21.

Figure 12C:
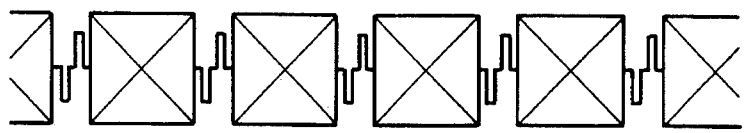
Figure 12D:

If the reproduced track is an audio track, an audio signal is recorded in four divided sectors as shown in FIG. 8. Thus, in this case, at the output of the luminance signal processing circuit 10 appear pulses that vary from low to high levels at each portion demarcating the sectors (as shown in FIG. 12C), in addition to the original audio signal component. A flag that swings to a low level is likely to be detected by the synchronizing signal separating circuit 24 as a vertical synchronizing signal erroneously and, as a result, the output of the synchronizing signal separating circuit 24 is produced four times per rotation of the disk 21 as shown in FIG. 12D.

Figure 12E:
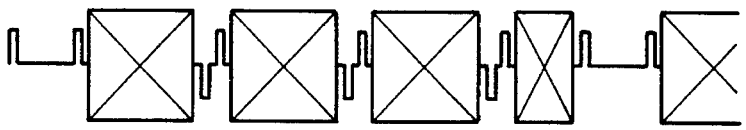
Figure 12F:
Figure 12G:
Figure 12H:
Figure 12I:
Figure 12J:
Figure 12K:
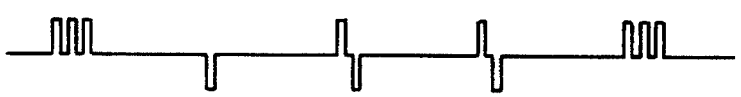
Figure 12L:

The above is a case where an audio signal of sufficient volume is recorded in all the 4 sectors. For a case where an audio signal of sufficient volume is recorded in 3.5 sectors, the outputs of the luminance signal processing circuit 10 and synchronizing signal separating circuit 24 are as shown in FIGS. 12E and 12F. Similarly, if an audio signal of small volume is recorded in 1.5 sectors or 0.5 sector, or few audio signals are recorded, the outputs of the luminance signal processing circuit 10 and synchronizing signal separating circuit 24 are as shown in FIGS. 12G to 12L.

That is, in either case, the synchronizing signal separating circuit 24 outputs at least four detection signals during one full rotation of the disk 21, as long as the reproduced track is an audio track.

Thus, the CPU 12 checks the value of the variable N upon one full rotation of the disk 21 (Steps S13, S14), and if the variable N is 2 or greater, it judges that the reproduced track is an audio track and turns off the lower contact of the switch 14 shown in FIG. 10 to mute the video signal (Steps S14, S15). Further, if the variable N is 1 or smaller, the CPU 12 judges that the reproduced track is a video track and turns off the upper contact of the switch 14 shown in FIG. 10 to mute the audio signal (Steps S14, S16).

FIG. 13 is a flow chart showing another set of processing steps of the track judgment apparatus of the invention. In this case, if no output of the synchronizing signal separating circuit 24 is detected or if its output is detected but only once from detection of a first PG pulse (Step S21) to detection of a next PG pulse (during one rotation of the disk 21), then the reproduced track is judged to be a video track (Steps S22, S24, S25, S23). When the output of the synchronizing signal separating circuit 24 is detected twice, the reproduced track is judged to be an audio track (Steps S25 to 27).

Figure 14:
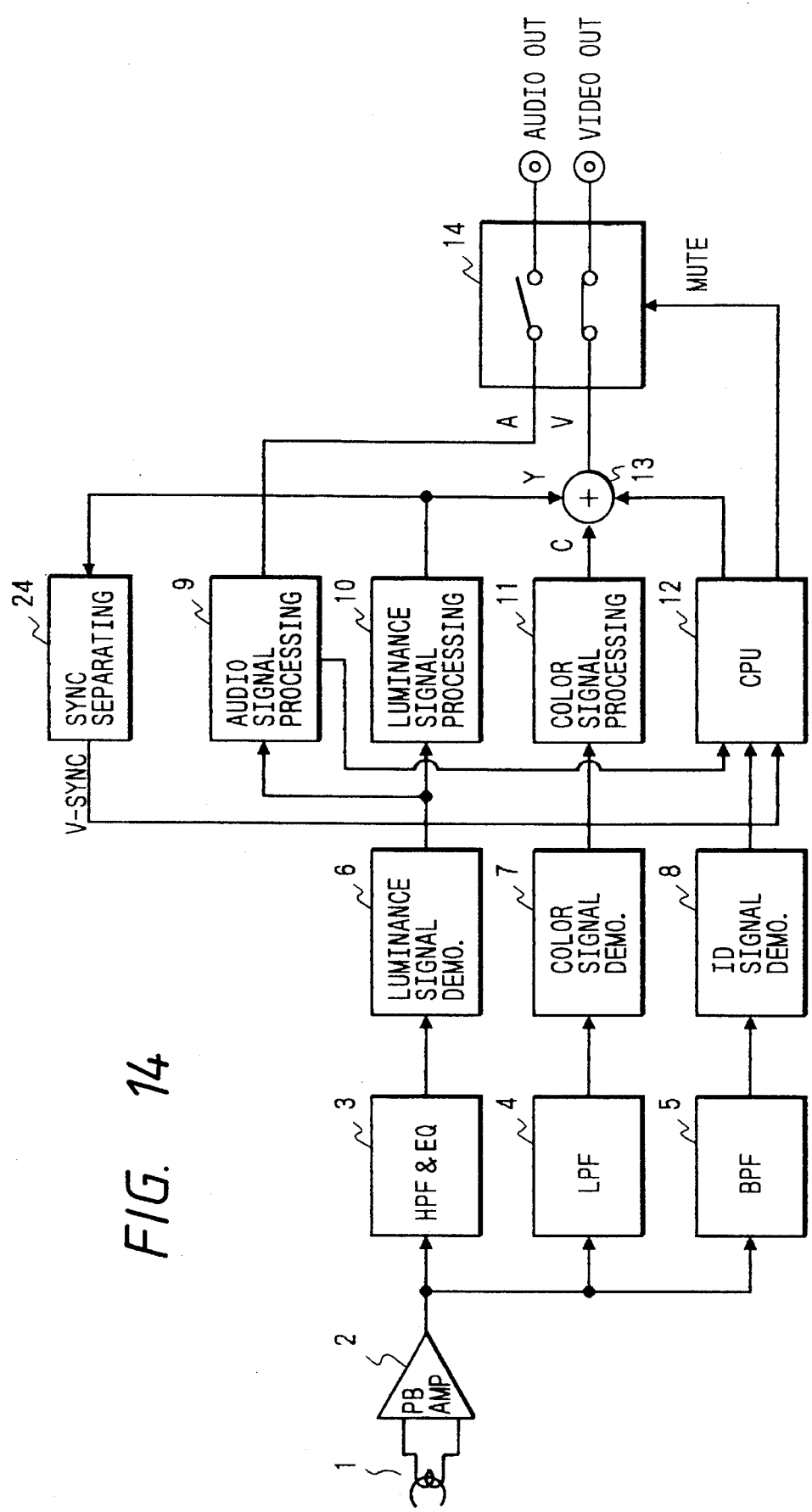
FIG. 14 is a block diagram showing a reproducing system to which another example of a track judgment apparatus according to the invention is provided.
Figure 15:
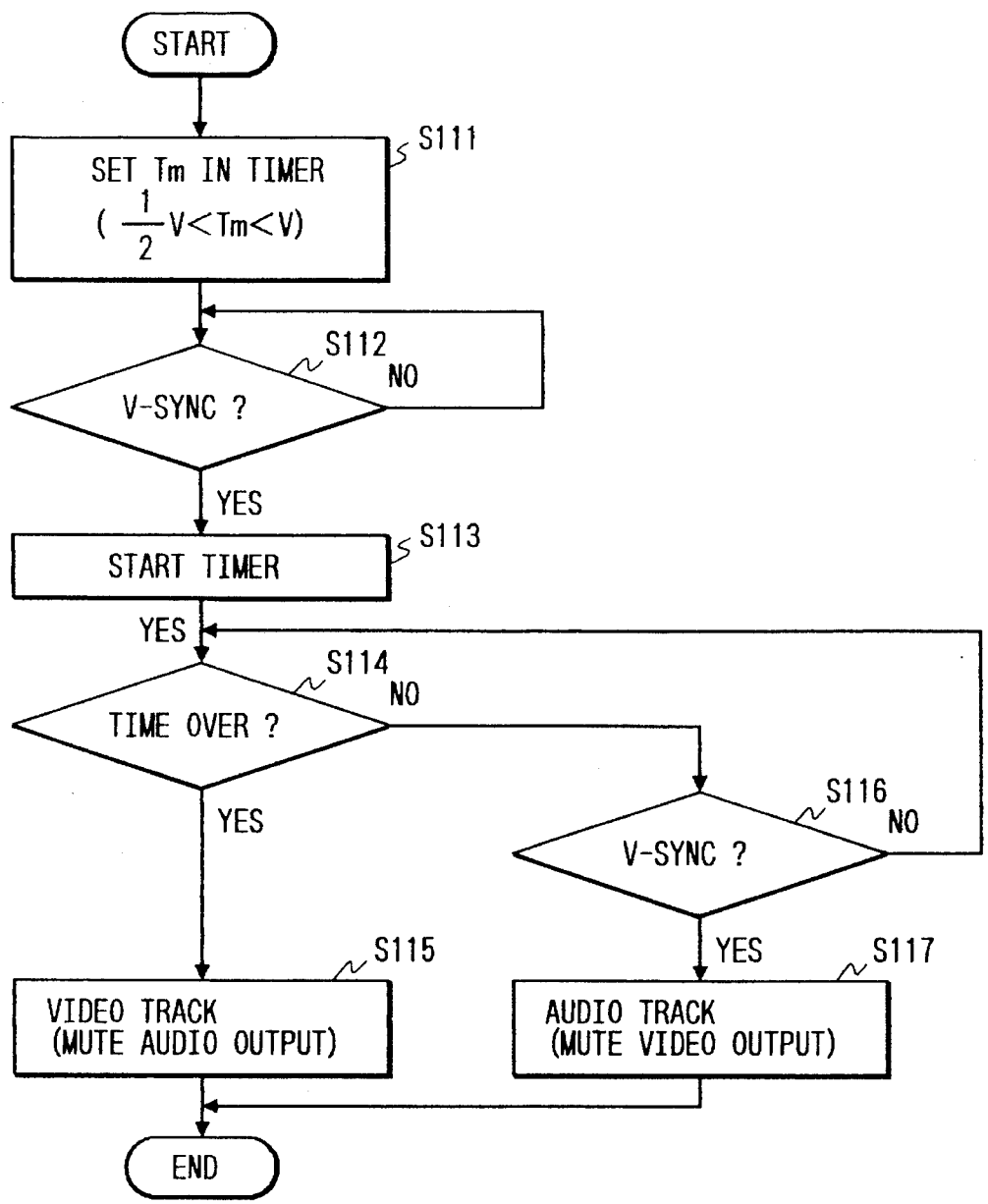
FIG. 15 is a flow chart for a description of operation of the embodiment shown in FIG. 14.

FIG. 14 is a block diagram showing track judgment circuitry according to a further embodiment of the invention. Again, the same reference numerals designate like parts shown in FIGS. 1 and 10, and their description will be omitted to avoid repetition. The operation will be described with reference to FIG. 15 under an assumption that either a video signal or an audio signal is recorded on a track to be reproduced.

In this embodiment, instead of relying on the PG signal as in the embodiment of FIG. 10, the CPU 12 sets a period of time Tm into its built-in timer, the period Tm satisfying the relation V/2<Tm<V (V being the duration of one field) and then monitors the output of the synchronizing signal separating circuit 24 (Steps S111, S112). When the synchronizing signal separating circuit 24 has generated a vertical synchronizing signal detection output, the CPU 12 starts the timer (Step S113). When the synchronizing signal separating circuit 24 has generated a vertical synchronizing signal detection signal again before the timer counts a set period Tm of time, the CPU 24 judges that the reproduced track is an audio track, and turns off the lower switch shown in FIG. 14 to mute the video signal (Steps S114, S116, S117).

When the synchronizing signal separating circuit 24 generates no detection signal while the timer is counting the set period Tm of time, the CPU 12 judges that the reproduced track is a video track, and turns off the upper switch shown in FIG. 10 to mute the audio signal (Steps S114, S115).

If the track which is currently reproduced is a video track, the luminance signal processing circuit 10 outputs a luminance signal as shown in FIG. 12A. Therefore, the synchronizing signal separating circuit 24 outputs one synchronizing signal separation output as shown in FIG. 12B for one field corresponding to each full rotation of the disk 21. Accordingly, if the period Tm is set less than 1 V (Tm<V), there is no possibility that no next detection signal has been produced until the timer counts up the set period Tm.

As described with reference to FIG. 8, the audio track is composed of four sectors. If the reproduced track is an audio track, an audio signal is recorded in four divided sectors as shown in FIG. 8. Thus, in this case, at the output of the luminance signal processing circuit 10 appear pulses that vary from low to high levels at each portion demarcating the sectors (as shown in FIG. 12C), in addition to the original audio signal component. A flag that swings to a low level is likely to be detected by the synchronizing signal separating circuit 24 as a vertical synchronizing signal erroneously and, as a result, the output of the synchronizing signal separating circuit 24 is produced four times per rotation of the disk 21 as shown in FIG. 12D.

The above is a case where an audio signal of sufficient volume is recorded in all the 4 sectors. For a case where an audio signal of sufficient volume is recorded in 3.5 sectors, the outputs of the luminance signal processing circuit 10 and synchronizing signal separating circuit 24 are as shown in FIGS. 12E and 12F. Similarly, if an audio signal of small volume is recorded in 1.5 sectors or 0.5 sector, or few audio signals are recorded, the outputs of the luminance signal processing circuit 10 and synchronizing signal separating circuit 24 are as shown in FIGS. 12G to 12L.

That is, in either case, the synchronizing signal separating circuit 24 outputs at least four detection signals during one full rotation of the disk 21, as long as the reproduced track is an audio track.

Figure 16A:
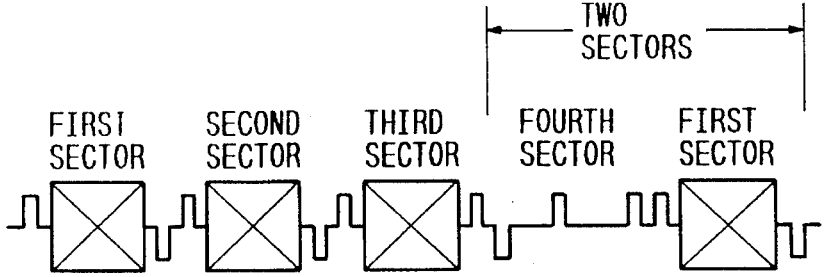
FIGS. 16A and 16b are diagrams showing a track format of an audio signal and a detection signal, respectively.
Figure 16B:
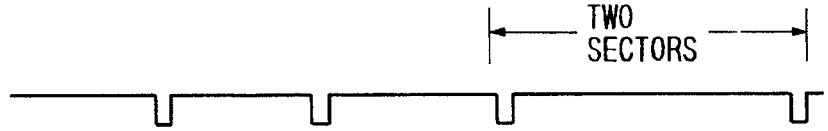

The longest period during which no detection signal is produced is, as shown in FIG. 16, a period corresponding to about two sectors (V/2) from the fourth sector to the following first sector, when the audio signal is recorded on the first sector of either type 1 or 2, and no audio signal is recorded on the fourth sector of the type 4. In this case, it should be noted that the audio signals are necessarily recorded on both the second and third sectors and the period corresponding to about two sectors is slightly shorter that V/2. Accordingly, if the period Tm is set longer than the period corresponding to two sectors (V/2<Tm), at least one detecting signal is produced during the period Tm.

In summary, with the period Tm being set to V/2<Tm, if no detecting signal is produced during such a period Tm, it is judged that the video signal is recorded on the track. In other words, it is possible to determine the sort of the tracks based on the number of vertical synchronizing signals (intervals).

As will be understood from the above description with reference to FIGS. 12A–12C and 3, the synchronizing signal separating circuit 24 outputs at least four detection signals during the one-field period V as long as the reproduced track is an audio track. Thus, if the reproduced track is a video track, the interval of a vertical synchronizing signal detection signal corresponds to the one-field period V, while if the reproduced track is an audio track, its interval is less than ½ the one-field period V. Hence, the type of track can be judged from the vertical synchronizing signal interval.

While the synchronizing signal separating circuit 24 is provided separately from the luminance signal processing circuit 10 in the above embodiment, a synchronizing signal separating circuit 24 incorporated within the luminance signal processing circuit 10 may also be used.

As described in the foregoing, according to the track judgment apparatus of the invention, the number of vertical synchronizing pulses is counted during a predetermined period. As a result, the type of track can be judged without being affected by errors or the like in reading ID signals or control codes, and without requiring any audio signal processing circuit or ID signal demodulating circuit.

What is claimed is:

1. An apparatus for discriminating between video and further signals during reproduction of a signal by a reproducing means from a medium storing both video and further information, wherein reproduced video signals include a predetermined signal portion occurring at a video signal frequency, said apparatus comprising:

first means for generating a detection signal during reproduction of a video signal upon the occurrence in said reproduced signal of said predetermined signal portion, and for also generating said detection signal during reproduction of a further signal upon the occurrence of a signal portion similar to said predetermined signal portion; and second means for determining said reproduced signal to be a further signal only if said first means generates said detection signals at a frequency higher than said video signal frequency.

2. An apparatus according to claim 1, wherein said predetermined signal portion comprises a vertical synchronizing signal.

3. An apparatus according to claim 2, wherein said video signal frequency is once per field of said reproduced video signal.

4. An apparatus according to claim 1, wherein said second means comprises:

third means for defining a predetermined period; and fourth means for determining the number of detection signals generated during said predetermined period.

5. An apparatus according to claim 4, wherein said third means comprises a timer.

6. An apparatus according to claim 5, wherein predetermined period is no greater than the duration of a field of a reproduced video signal.

7. An apparatus according to claim 6, wherein said predetermined period is no less than substantially half the duration of a reproduced video signal.

8. An apparatus according to claim 7, wherein predetermined signal portion comprises a vertical synchronizing signal.

9. An apparatus according to claim 4, wherein third means comprises means for generating periodic signals in accordance with transport of said medium.

10. An apparatus according to claim 9, wherein said medium comprises a disk and said third means comprises means for generating periodic signals in accordance with rotation of said disk.

11. An apparatus according to claim 10, wherein said predetermined period is one revolution of said disk.

12. An apparatus according to claim 11, wherein said periodic signals are generated once per revolution of said disk.

13. An apparatus according to claim 1, wherein said first means is a vertical synchronizing signal separation circuit which provides said detection signal as an output during reproduction of both video and audio signals.

14. A disk reproduction system, comprising:

first means for reproducing signals from a disk, said reproduced signals comprising video and audio signals and said video signals including vertical synchronizing signals;

second means for generating a detection signal during reproduction of a video signal upon the occurrence in the reproduced signal of said vertical synchronizing signals and for also generating said detection signal during reproduction of an audio signal upon the occurrence of a signal portion similar to said vertical synchronizing signal; and third means for determining said reproduced signal to be an audio signal only if said second means generates said detection signals at a frequency greater than a frequency at which said vertical synchronizing signals occur in said reproduced video signals.

15. Track judgement apparatus for discriminating between audio and video signals reproduced from a disk, comprising:

reproducing means for reproducing a video signal including a synchronizing signal, which is recorded on a video track and an audio signal including a control signal, which is recorded on an audio track;

separating means for separating said synchronizing signal from an output of said reproducing means when said video signal is being reproduced and for separating said control signal from the output of said reproducing means when said audio signal is being reproduced, to output a detection signal;

detecting means for detecting one rotation of said disk; and determining means for counting a number of outputs of said detection signal during one rotation of said disk and judging whether said count coincides with a number of said synchronizing signals which are reproduced during one rotation of said disk when a video signal is being reproduced, said determining means determining that a signal other than a video signal is being reproduced only when said count is greater than a number of detection signals which are detected during reproduction of a video signal.

16. Track judgement apparatus, comprising:

reproducing means for reproducing a video signal including a synchronizing signal, which is recorded on a video track an audio signal including a control signal, which is recorded on an audio track;

separating means for separating said synchronizing signal from an output of said reproducing means when said video signal is being reproduced and for separating said control signal from the output of said reproducing means when said audio signal is being reproduced, to output a detection signal;

determining means for determining whether a second detection signal output of said frequency detection signal occurs within a predetermined period, not longer than an interval of said vertical synchronizing signal, after a first detection signal output from said separating means.

17. A method for determining a type of reproduced signal comprising the steps of:

(i) reproducing at least one of a recorded video signal including a synchronizing signal and a recorded audio signal including a control signal;

(ii) separating said synchronizing signal from said reproduced video signal when said video signal is being reproduced and separating said control signal from said reproduced audio signal when said audio signal is being reproduced to generate a detection signal; and (iii) determining said detection signal to represent at least one of a video signal and an audio signal based on a frequency of said detection signal, said determining step comprising determining said reproduced signal to be an audio signal when the frequency of said detection signal exceeds the frequency of a detection signal associated with a video signal.

18. An apparatus according to claim 14, wherein said detection signal is a pulse generated once for each occurrence in said reproduced signal of said vertical synchronizing signals and generated once for each occurrence in said reproduced signal of said signal portion similar to said vertical synchronizing signal.

* * * * *

UNITED STATES PATENT AND TRADEMARK OFFICE
CERTIFICATE OF CORRECTION

PATENT NO. : 5,579,123
DATED : November 26, 1996
INVENTOR(S) : Sato

It is certified that error appears in the above-indentified patent and that said Letters Patent is hereby corrected as shown below:

On the cover sheet, Section [73], please correct the Assignee to read:

--Asahi Kogaku Kogyo Kabushiki Kaisha, Tokyo, Japan--

Signed and Sealed this

Nineteenth Day of August, 1997

Attest:

BRUCE LEHMAN

Attesting Officer

Commissioner of Patents and Trademarks